US005641370A

United States Patent [19]
Sanko

[11] Patent Number: 5,641,370
[45] Date of Patent: Jun. 24, 1997

[54] METHOD FOR MAKING A LAMINATE FROM SYNTHETIC RESINOUS SHEETS

[75] Inventor: William John Sanko, Fairview, Pa.

[73] Assignee: Alfred D. Lobo Co., Cleveland, Ohio

[21] Appl. No.: 560,890

[22] Filed: Nov. 20, 1995

Related U.S. Application Data

[60] Division of Ser. No. 262,598, Jun. 20, 1994, Pat. No. 5,472,556, which is a continuation-in-part of Ser. No. 81,639, Jun. 24, 1993, Pat. No. 5,470,428.

[51] Int. Cl.⁶ ..................................................... B30B 15/34
[52] U.S. Cl. ........................................... 156/228; 156/583.1
[58] Field of Search ................................... 156/228, 498, 156/539, 583.1; 100/137, 196, 207

[56] References Cited

U.S. PATENT DOCUMENTS

| | | | |
|---|---|---|---|
| 3,241,189 | 3/1966 | Siempelkamp | 425/143 |
| 3,752,060 | 8/1973 | Hubert et al. | 100/196 |
| 4,337,113 | 6/1982 | Searle | 156/353 |
| 4,478,673 | 10/1984 | Plocher | 156/498 |
| 4,543,147 | 9/1985 | Noto et al. | 156/288 |
| 4,565,481 | 1/1986 | Pagnoni | 414/285 |
| 4,658,947 | 4/1987 | Wilder | 198/346.2 |
| 4,846,925 | 7/1989 | Ishida et al. | 156/583.1 |
| 4,936,765 | 6/1990 | Bonvini | 425/144 |
| 5,066,351 | 11/1991 | Knoll | 156/212 |
| 5,470,428 | 11/1995 | Sanko | 156/498 |
| 5,472,556 | 12/1995 | Sanko | 156/498 |

*Primary Examiner*—James Sells
*Attorney, Agent, or Firm*—Alfred D. Lobo

[57] ABSTRACT

A simple combination of conventional operations uses a twin press configuration of tandem stationary, vertically acting heating and cooling platen presses in separate frames which share a fixed, hybrid bottom platen in a laminating machine. The machine therefore has aligned daylight openings ("daylights"). A set of sheets to be laminated is sandwiched between cover plates of a book which is loaded by rollingly transferring it with an edge-conveyor means, into the heating press. The path in which the book is processed ("process-path") starts at an entrance station and progresses linearly through the daylights. The system operates with a minimum cycle time based on the physical properties of the sheets to be laminated. Successive books may be loaded, in a machine using only two single daylight openings; or, in ganged single daylights; depending upon the capacity per unit time sought. A novel quick-locking carrier is provided in which a sandwich to be laminated is held.

1 Claim, 8 Drawing Sheets

METHOD FOR MAKING A LAMINATE FROM SYNTHETIC RESINOUS SHEETS

This is a division of patent application Ser. No. 08/262,598 filed on 20 Jun. 1994, U.S. Pat. No. 5,472,556, which is in turn a continuation-in-part application of Ser. No. 08/081,639 filed on 24 Jun. 1993, U.S. Pat. No. 5,470,428.

BACKGROUND OF THE INVENTION

This invention relates generally, to the art of making a laminate of plural large sheets of thermobondable, laminar stock. More particularly, it relates to a laminating machine and to a process of making a laminate in a unique laminating system. The term "system" is used to refer to the laminating machine in combination with the roller means supported on tables, which roller means allow the work to be returned to an operator of the machine. The term "laminating machine" refers to one with a single lower platen, and plural individual heating and cooling platens above the lower platen, the lower platen being fixed, to avoid the problems associated with double-acting rams, and fabricated to provide both heating and cooling stages which act effectively as separated lower platens; a pair of endless loop conveyor means which engage the "work" only near its opposed lateral edge-portions and which together guide the work and position it with appropriately timed stops and starts, to a discharge station.

At least one side of one of the sheets is imprinted or otherwise marked with indiciae providing data on the card, which data are to be read, either visually by human eyes, or by a photoelectric means such as a photoelectric eye, or some other data reading means. When the laminate is to yield wallet-size (about 8.5 cm long×5.5 cm wide) credit cards, indiciae include a logo and/or letters spelling out the name, or otherwise indicating the issuer of the card, shapes of different color printed against a background of yet another color, a hologram, which together unmistakably identify the issuer, and also, letters spelling out the name of an individual or organization to which the card is issued, with numerals which provide an identification code, and optionally still other alphanumeric symbols which serve the purpose of providing information desired by the issuer of the card when it is used or misused for its (the card's) specified purpose. Such letters, numerals and symbols are typically embossed to raise them above the smoothly planar surface of the card, and correspondingly to indent them on the card's rear surface. Operating instructions to be left outdoors on "instructions" card for a machine, a frequently used map of a city, or of a geographical region, or any information on a card which is frequently handled, may also be provided on, or cut from, a laminate made in the machine of this invention.

The problems encountered in the production of a laminate such as the one produced herein stem from uneven temperature and pressure distribution, and particularly having to transport and store hot pressed laminates before they are cooled under pressure. The physical limitations of a sheet of thermobondable synthetic resinous material from which the laminate is made, and the requirement that the laminate maintain essentially the same sharpness of color and resolution of image as in a printed sheet of paper, after it has been subjected to aggressive heating and cooling conditions, requires that the work be treated (heated then cooled) only after it is encased between the cover plates of a thermally conductive carrier. These preconditions distinguish the task at hand from laminating plywood, forming laminates of inorganic materials which are adhesively bonded, or thermobonding a thermoplastic translucent film to a document, or heat-sealing a thermally substantially insensitive article, such as a paper document, between opposed such films.

Though a large laminate of plural sheets of thermobondable stock is technically designated the "work" in this art, it will be referred to herein as a "large laminated sheet of credit cards", and for brevity, "a laminate". A laminate is typically formed from an assembly of a core sheet, or split core sheets in congruent contact with each other, held between upper and lower translucent or transparent protective foils termed "overlays". The function of the overlays is to provide an attractive finish, and at the same time, to protect the core stock from the effect of sunlight, moisture, and to help resist wear and tear from frequent use of the card. A core sheet of plural core sheets is termed a "split core". Such a laminar assembly of a core sheet(s) and overlays is referred to as a "product pack" or "set".

To laminate a single set it is preferred to maintain the cover plates, one lying laterally directly above the other with a set held therebetween, without using a hinge to connect the cover plates, because a single set held in the cover plates is typically thinner than any practical hinge. If a hinge is used, it is essential that the laminating machine be operated in a manner such that the hinge is positioned outside the area in which the upper platens contact the upper cover plate compression zone.

A single set, or an assembly of sets, referred to herein as a "sandwich", may be laminated between heat-conductive cover plates. A sandwich is typically made up with from 1 to 10 sets, though as many as 20 may be used if the materials to be laminated allow. To be "processed" (compressively heated, then cooled), a sandwich is placed in a sandwich "carrier" or "transfer tray" comprising upper and lower cover plates between which the sandwich is tightly and compressibly held. The carrier with the sandwich in it, is referred to as a "carrier assembly", also termed a "book". The book is referred to as a "monobook" when it sandwiches only a single set.

A set typically comprises at least one sheet of core stock of uniform thickness, and often two sheets, of relatively thick core stock (relative to the "overlays") of thermoplastic synthetic resinous material suitably imprinted or otherwise marked with indiciae, between opposed overlying "overlays" of "finish stock" or "plastic film", each overlay congruently disposed upon the exposed upper and lower surfaces of the core sheet(s). The core sheet(s) is relatively thick, at least 0.125 mm (5 mils), and usually from 0.25 mm (10 mils) to 1.27 mm (50 mils), compared to the overlays. Such an overlay may be a self-supporting thermoplastic, essentially light-permeable (that is, transparent) thin sheet from about 0.00635 mm (0.25 mil) to 0.0762 mm (6 mils) thick, or a non-self-supporting thin film from about 1.25 μm (0.1 mil) to about 6.25 μm (0.5 mil), of a thermoplastic resinous material referred to as a "varnish" which is chosen because it is compatible with the thermoplastic core sheet stock upon which it is coated, for example by screen printing it on, to provide a layer of uniform thickness. By "compatible" is meant that, upon heating under pressure at a temperature above the Tg of the overlay, the overlay is thermally bonded to the core stock, so that there is no phase separation and no discernible boundary therebetween. The outer surfaces of the core stock may also be coated with an adhesive which is compatible with both, the core stock and the polymeric material of the overlay.

In addition, each sandwich, whether of a single or plural sets, necessarily includes a pair of flexible, elastomeric sheets of uniform thickness, or thin pads of woven metal gauze, referred to as "lamination pads" placed above and below a pair of first and second polished plates, one in contact with the uppermost and the other in contact with the bottom set in a sandwich. The lamination pads placed between each cover plate and a polished plate, perform a critical function, namely, they distribute the pressure exerted by the platens essentially uniformly over the surface of the overlays and core sheet. Insufficient pressure over even a small area, from 0.1 mm$^2$ to 1 mm$^2$ will cause "lakeing", namely, leaving a depression in the surface, a defect which may be visually observed by tilting the surface of a laminate at an angle towards a beam of light. Too great a pressure, on the other hand, will cause "running" evidenced by the edges of the laminate being advanced past the original boundaries of the core sheet, and bleeding of the colors of the inks used to print the indiciae on the core sheet. Both distortion and bleeding of colors is also encountered when the hot laminate is held in the book too long.

Though a sandwich of a single set may be processed, it is impractical to process individual sets separately because of the limited throughput in any prior art machine. Therefore, typically, multiple sets are simultaneously processed by interleaving each set with a thin metal plate from 0.49 mm (20 mils) to 0.98 mm (40 mils) thick, typically 0.635 mm (25 mils), having highly polished or microfinished surfaces which transfer their finish to the overlays. In practice, a sandwich may include from 5 to 20 sets having from 6 to 21 polished plates, respectively. Even more so than with a single set, it is critical that a chosen set pressure, typically about 689 Kpa (100 psi) in the heating press, and about 2756 kPa (400 psi) in the cooling press, will be exerted essentially continuously on the multiplicity of sheets in a sandwich, after the carrier is biased against the upper stationary platen, and that this pressure be uniformly distributed. By "uniformly distributed" is meant that there is no difference in pressures exerted per unit area measured at spaced-apart, coplanar portions in either the uppermost surface of a set, or, in portions in the lowermost surface of a set, sufficient to cause a visually unacceptable finish on the processed laminate.

Each sandwich is placed between rigid upper and lower cover plates, one vertically aligned above the other, having mutually facing planar surfaces for contacting the upper and lower surfaces of a set, and having lengthwise and widthwise dimensions exceeding those of the sandwich. Such a laminar assembly is referred to as a "book". Each book is compressively heated, then cooled, each of these steps being carried out under pressure, to form the laminate. The cover plates are biased, one against another, under a pressure which is maintained essentially constant during the heating cycle, and is exerted in a direction orthogonal (at right angles) to the direction in which the book is to be translated on a conveyor. One skilled in the art will appreciate that the specifications for the cover plates will depend upon the demands of rigidity, which in turn will depend upon the pressures to be experienced in the press. For obvious reasons, metals with high thermal conductivity and a high modulus of elasticity in shear or a high coefficient of rigidity. Since metals such as aluminum have high thermal conductivity but a lower coefficient of rigidity than steel, a common preferred choice is a cover plate as thin as 0.16 mm (0.0625"), but usually from about 1 cm (0.375") to 2 cm (0.75") thick, made of aluminum, or bronze where the cost can be justified.

Instruction cards, and credit cards in particular, are issued by the tens of thousands, and sometimes the million, to persons and organizations many of whom may, or may not, be benefitted by the receipt and use of the card. Since the cards are generally to be made in a single "production run", there is a high premium on the rate at which a "book" can be processed.

Until relatively recently, a book was processed in conventional laminating devices comprising upper and lower "dual-function" platens (so termed because they could both heat and cool the "work"), one or both of which were provided with hydraulic motive power to move at least one of the platens in the vertical direction, so that the lower face of the upper platen and the upper face of the lower platen tightly held and compressed the "work" therebetween. The dual-function platens were each provided with internal or external heating means, which in conjunction with appropriately programmed electrical timer means, enabled the platens to be synchronously heated to the desired temperature at which satisfactory lamination was effected; and, each platen was also provided with internal or external cooling means which enabled the platens, after each set in each book was laminated or otherwise treated, to be synchronously cooled to the desired temperature at which the "book" could be discharged from between the cold platens. However, the loss of time inherent in having to cool a heated platen after a "book" was processed in a dual-function platen press, was unacceptable when a large order or "run" of credit cards had to be delivered to a purchaser (eventually, the issuer of the credit cards) under the pressure of an unrealistically short deadline. Some of the problems endemic with dual-function presses equipped with multiple platens are addressed in U.S. Pat. No. 3,241,189 to Siempelkamp.

This problem, namely, the need to deliver a very large number of satisfactorily laminated credit cards in a short time, implanted an expectation of high productivity in prospective purchasers and users of laminating presses for credit cards, which expectation resulted in this characteristic becoming the sine qua non specifiction to be met by a laminating machine which was acceptable to such a purchaser or user.

To this end, laminating presses have been constructed with the emphasis on economy and ease of operation, and speed. For example, in U.S. Pat. No. 4,543,147 to Noto et al, the discovery that the compressive heating of a book could be interrupted, led to the use of a bi-level tandem multiple daylight opening presses in which the platens intermediate the ram platen and the fixed upper platen, were interconnected for identical up-and-down movement. Each press has one daylight opening for heating and the other daylight opening (or "daylight" for brevity) in the same press, for cooling. After treatment in one level (the upper level, shown) of the machine, books are stacked in a stacking press, and on their return, the books are treated in the lower level, by being sequentially precooled in the same press they are finish-heated (a very large temperature difference $\Delta T$), then finish-cooled in the same press they were pre-heated (a smaller, but still large $\Delta T$).

The net effect is to reduce the cycle time for a book. But their requirement that there be vertically spaced apart entrance and discharge stations, so that the press may be operated by a single operator stationed at the entrance station of the press, resulted in having to use a "stacking press" which provided no function other than to store, then return the heated book to the first of two tandem cooling presses. In addition to the cost of an additional press, the stacking press provides a substantial delay between transfer of a book from the heating to the cooling zones which is generally deleterious in making laminates which are highly sensitive to the heating and cooling cycles, as is, in particular, the laminate of this invention.

Moreover, the use of heating and cooling cycles in the same press require that the same pressure be used for heating and cooling. This is incompatible with maximizing the "window of lamination" which dictates one use the lowest practical pressure in the heating cycle to minimize "bleeding" of colors and distortion of lines, and, the highest practical pressure in the cooling cycle to "iron out" microscopic and submicroscopic surface irregularities when the polymer as cool as will permit doing so, again to minimize distortion. Making most laminates demands utilizing the "window" to allow one to meet the quality criteria for a no-defect, high-gloss, "ultra-finish".

Further, a finish-heating cycle in the upper daylight of the same press in which the lower daylight is used to precool a book, requires the press to operate reliably despite an inordinate temperature gradient $\Delta T$ which is only slightly less in the first press where the upper daylight is used to preheat, and the lower daylight to finish-cool, than in the second press.

A different approach utilized a "stack" of several "books" which could be simultaneously loaded into successive heating and cooling presses, each of which comprised multiple platens, referred to as multiple opening presses.

A press with a single pair of platens is referred to as a "single daylight opening" (or "SDO") press, or a "single daylight" (or "SD") press, and a press with multiple daylight openings is referred to as a multiple daylight opening ("MDO") press, or, a multiple daylight ("MD") press. Such MDO presses are commercially available from Robert Burkle Gmbh & Co., West Germany; and, Oakwood Design, England; inter alia. Because these presses rely on each book in an opening of a free standing MDO heating press "shunting" another book into its subsequent position in a corresponding opening of a MDO cooling press, any significant misalignment of the shunting and shunted books in the lateral plane, results in a problem. Further, such prior art MDO presses require the use of a loading device which simultaneously pushes multiple books to feed the books from a storage magazine to the MDO heating press, and thence to the cooling press, and it is difficult to maintain the path of the books in a longitudinally axial path.

The laminating machine of this invention operates as if it was a SDO press because the downward acting heating and cooling platens are substantially synchronously reciprocable; in operation, all rams exert pressure on the books under them at about the same time, and all are raised at about the same time, so the books from under each can be moved from under them.

Against this background of concentrated effort devoted to solve the problems endemic to the operation of a laminating machine for a set of thermoformable synthetic resinous sheets, for making laminates of all types and sizes including plywood, identification cards and circuit boards, this invention provides easily available components which in combination can be adapted for any of the foregoing purposes. With the use of ganged heating and cooling presses and a "hybrid bottom platen" with alternating plural heating and cooling sections, the cycle time for processing a book may be lowered to be competitive with any known machine. By "hybrid bottom platen" reference is made to a substantially continuous, that is, unitary, fixed bottom platen which contains both, a heating section and an adjacent cooling section.

For maximum production, still another embodiment, referred to as the "ganged tandem presses" is used. Details for the construction and operation of ganged tandem heating and cooling presses in a laminating machine are provided herebelow for those instances when maximum production in a minimum time is demanded whether a monobook or a book is to be processed.

Production may also be maximized by using a book for a single set, referred to as a "monobook" because it is designed to hold no more than one set, provided one uses a single fixed, that is, stationary, continuous bottom platen which is common to both the heating and cooling stages, as described in greater detail below.

SUMMARY OF THE INVENTION

It has been discovered that laminating a single set of thermobondable sheets in a "monobook" provides an effectively scrap-free and economic method of making credit cards, provided the bottom platen of a two-step laminating press is stationary, and substantially unitary but divided along its longitudinal axis (x-axis) into heating and cooling sections, hence referred to as a "hybrid bottom platen". By "substantially unitary" is meant that heating and cooling portions of the platens may not be spaced apart sufficiently to interfere with the transfer of a book from one portion to another, coplanarly.

It has also been discovered that slidably transporting the monobook, or a book containing a sandwich of plural sets of thermobondable, synthetic resinous material, whether thermoformable or thermoplastic, or both, along the surface of the hybrid bottom platen, provides high throughput and ideal process control, yet minimizes risk of overheating the material. Overheating is found more likely to give rise to defects in a heated laminate than the interruption of a heating cycle during which the laminate is formed; and, that the ability to maintain the platens of a heating or cooling press at a desired temperature to exert the desired pressure, utilizes the optimum "windows" for heating and cooling the book, and results in economically attractive cycle times for making a laminate.

It is therefore a general object of this invention to provide a laminating system which avoids storing heated laminates and accelerates their cooling so as to minimize the deleterious effects of transporting and storing a hot laminate for more than about 1 minute, preferably to keep the period between the start of a cooling cycle and the completion of a heating cycle to less than 30 sec.; and, for a monobook, to keep the period between the start of a heating cycle and the completion of a cooling cycle to less than 30 sec.

It is a specific object to utilize a fixed hybrid bottom platen to avoid using a lower set of rams, and, to utilize a "monobook" which is processed in at least one "laminating unit". In a twin press configuration, a single laminating unit comprises a continuous bottom platen with an initial heating section and a subsequent cooling section, and, positioned directly above each, an upper heating and an upper cooling platen at corresponding temperatures and having areas corresponding to those in the sections of the continuous bottom platen.

A simple combination of conventional operations uses a configuration of tandem, stationary, twin presses with vertically reciprocable upper heating and cooling platens which have a single fixed, common hybrid platen. In this laminating machine, a book is most preferably loaded by transferring it onto the entrance station of the heating press, in a loading-path at right angles to the path in which the book is to be processed ("process-path"). The system operates with a minimum cycle time based on the physical properties of the sheets to be laminated. Successive books may be loaded, one at a time, to be processed in a flow-through linear processing path from the initial heating section of the hybrid bottom platen, through the cooling press, and onto a discharge station where the book is disassembled to yield a uniformly heated and cooled laminate the surfaces of which are free of objectionable defects.

It is therefore also a general object to provide a system for producing a laminate, the apparatus comprising, sequential tandem heating and cooling presses having a common fixed, hybrid bottom platen; laterally spaced apart endless loop conveyor means each side of which engages an opposed laterally spaced apart edge-portion of a book (hence referred to as "edge-conveyor means") which is supported on the hybrid platen, and advances the book unidirectionally only in the direction of the process path while the book is being processed; and, a book-feeding means. Preferably a book to be processed is transferred to an entrance station by a loading-conveyor means and removed from the cooling zone by a discharge-conveyor means; preferably, both the loading- and discharge-conveyor means are supported during operation, in substantially the same lateral plane as the edge-conveyor means. Together, the edge-conveyor means, which extends continuously over the length of the process path, and the loading- and discharge-conveyor means leading to the heating press, permit directly loading the heating press and unloading the cooling press, respectively, without interrupting the flow of books, seriatim, to the entrance station and to the heating press, and the edge-conveyor means permits simultaneously transferring a first book to the heating press while a second book is simultaneously transferred to the cooling press, and a third book is being discharged from the cooling press to the discharge station.

Throughout the system, the loading-path, the process-path and discharge-path of each book is maintained in substantially the same lateral plane. This is possible because the hybrid platen is continuous and the upper heating and cooling platens are indexable in a vertical direction to accept and discharge a book lying flat upon the upper surface of the hybrid platen. The operator cannot fail to present a book to be processed at the correct height because the book-support surface of the entrance station is fixedly disposed coplanarly with the book-support surface of the hybrid platen.

More particularly, the invention relates to a laminating machine used to apply and thermally, as well as, optionally, adhesively bond one sheet of synthetic resinous material to another, for example, by transferring a compressively heated book to a cooling station in less than 20 sec, allowing a large laminate 2 m (meters) long and 1 m wide to be produced with a defect-free surface, such as is required in the manufacture of credit cards, instruction cards, and the like.

Still more particularly, this invention relates to a laminating machine comprising separate, substantially synchronously reciprocable, upper hot and cold fluid-actuated platen presses, each operating with a single upper platen and a stationary lower horizontal hybrid platen, only the upper platen being driven vertically downwards towards the lower fixed platen; and each of the upper platens is longitudinally spaced apart in the direction (x-axis) in which the book is to be transferred, essentially linearly between the hot and cold presses, by a pair of laterally spaced apart (along the y-axis) separate endless chains or belts which engage opposed, lateral spaced-apart edge-portions of the book when it is to be transferred from the hot, to the cold press.

In a conventional process for sequentially forming a series of laminates in a laminating system comprising heating and cooling presses without a stacking press, the process comprising, loading books sequentially, each holding at least one set of congruently stacked thermobondable sheets of a synthetic resinous material, into a heating press having an upper heating platen and a lower heating platen; heating and compressing the sheets to form a heated laminate; transferring the heated laminate into a cooling press having an upper and a lower cooling platen; cooling and compressing the sheets to form a cooled laminate; and discharging a cooled laminate from the cooling press; wherein each of said foregoing steps are carried out at predetermined intervals; the improvement comprising:

a) introducing books, one at a time, into the heating press provided between an upper reciprocable heating platen, and a lower heating section of a fixed, hybrid bottom platen, the heating platen and hybrid platen being maintained at a laminating temperature above the glass transition temperature (Tg) or the melting point (m.p.) of the material, using an entrance station which provides a loading-path parallel to the processing path through the hot and cold presses;

b) advancing the reciprocable upper platen of the heating press downward to bias the book, exerting for a predetermined period of time, a desired pressure against the lower heating section of the hybrid platen directly beneath and in spaced apart relation with the upper platen;

c) retracting the upper platen upward;

d) conveying each book into the cooling press and biasing each book with a desired pressure against the lower cooling section of the hybrid platen with a down-acting upper cooling platen, for a predetermined time, until the book is cooled to a temperature below the Tg or m.p. of the material from which the laminate is formed;

e) and discharging each cooled book from the cooling press while simultaneously conveying another book into the cooling press.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which:

FIG. 1 is a top plan view of an embodiment of the laminating system (using the "basic" machine) in which books are loaded from an entrance station fed by a loading conveyor. The edge-conveyor means contacts the book which is transported into the heating press, then into the cooling press, and the processed book is discharged onto a discharge conveyor. During operation the edge-conveyor means and the discharge conveyor are in essentially the same lateral plane. After the sandwich is stripped from the carrier (book is unloaded), and then re-charged with a fresh sandwich, the book is returned along a return path which is parallel to the longitudinal x-axis and laterally displaced therefrom in the substantially the same plane as the edge-conveyor means. The loading- and discharge conveyors are shown with the preferred roller ball surfaces on which books are easily transferable so that, if a human operator is used, he never has to lift a book which may weigh from 15 Kg (31 lb) to 50 Kg (110 lb).

DETAILED DESCRIPTION OF PREFERRED EMBODIMENTS

The foregoing essential features of the novel laminating machine are provided in a combination of structural elements, and in mechanisms which are as simple to make as they are to operate. In a basic embodiment, only two presses are used, the first a heating press, and the second a cooling press, the platens of each being held at a substantially constant heating and cooling temperature respectively. This simple design in combination with maintaining substantially coplanar conveyors, namely the loading conveyor, edge-conveyor means, and discharge conveyor, unexpectedly results in elimination of storage of a hot book, allows a linear flow-path of the book while it is being moved longitudinally, and minimizes the cost of hardware since the heating press is side-loaded.

A first embodiment of the machine and the system will be described with reference to making a typical laminate in which two split core sheets are to be laminated with their blank sides back-to-back and their printed front and rear faces each protected with a translucent or transparent overlay. Each core sheet is 58.42 cm×71.12 cm (23"×28") and yields 80 individual wallet-size cards when cut; a smaller sheet is typically 50.08 cm×66.04 cm (20"×26") cut to 50 cards/sheet, and a larger one is 66.04 cm×193.5 cm (25"×30") cut to 100 cards/sheet.

A core sheet is typically of an essentially amorphous polymer such as poly(vinyl chloride) ("PVC") having a Tg in the range from 80°–85° C., or a polyester which is a copolymer commercially available under the Kodar trademark which has a comparable Tg, or a copolymer of styrene-acrylonitrile which has a Tg of about 108° C., or poly(methylmethacrylate), or a blend of styrene and poly (phenylene oxide) commercially obtainable under the Norel trademark which has a higher Tg; a core sheet may also be formed from a substantially crystalline polymer such as nylon, or a crystalline polyester having melting points in the range from 50° C. to 90° C., but with much less tolerance for temperature variation during the heating stage. The overlay may be chosen from the foregoing polymers in the form of a self-supporting film typically <0.0127 mm (0.5 mil) thick; or, it may be a non-self-supporting varnish to be coated upon the core sheets. Such a varnish is commercially obtainable from Apollo Chemical under the Allcolours brand. The core sheets and the overlays may each be made from the same or different polymers so long as the Tg and/or melting point are relatively closely matched.

In this first embodiment, illustrated in FIGS. 1, 2, 2A and 3, there is shown a plan view, a perspective view, and a front elevational view, respectively, of a laminating system, referred to generally by reference numeral 10, having two substantially identical upper heating and cooling platens 11 and 12, respectively, one (the cooling platen 12) behind the other (the heating platen 11) longitudinally along the process-path (along the x-axis) to be followed by a book (not shown) lying flat on lower heating section 11' where the book is transferred from entrance station 60. Heating elements 13, such as electrical heating elements or coils for heating fluid are embedded, or heating fluid channels are drilled, in platen 11 and in heating section 11' of hybrid platen 20 directly therebeneath; and, cooling fluid channels 14 are drilled, or fluid coils are embedded, in cooling platen 12 and in the corresponding cooling section 12' of hybrid platen 20 directly beneath. The lower heating platen 11' is the first or front section of hybrid platen 20 and the cooling platen 12' is the following section. The daylights defined by the bottom surfaces of the upper heating and cooling platens and the upper surface of the hybrid platen, are axially aligned.

Figure 2:
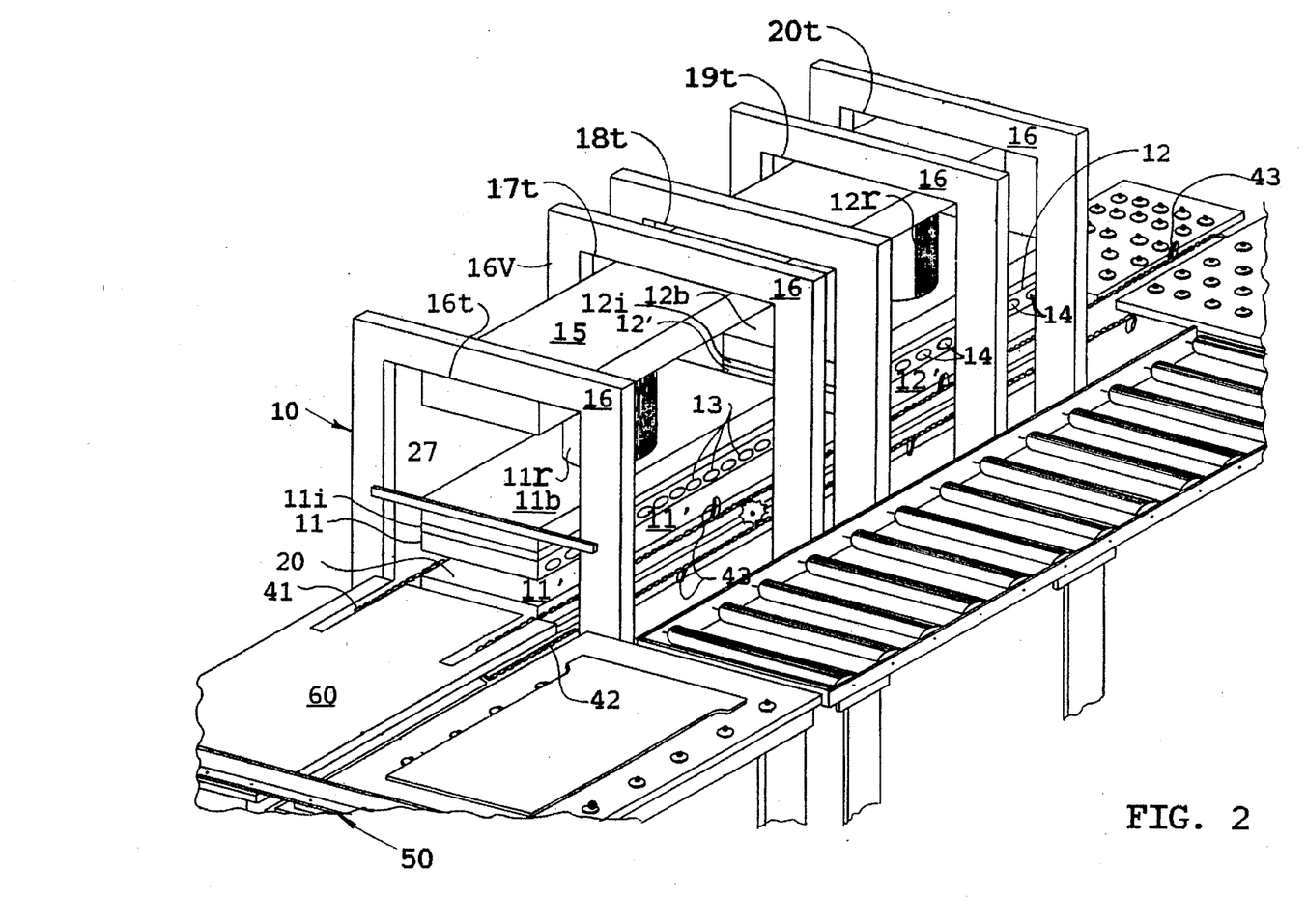
FIG. 2 is a front end perspective view of the machine shown in FIG. 1, showing the coplanar configuration of the path a book travels through the system, and the open space between the spaced-apart edge-conveyors provided by the window frame structure.
Figure 2A:
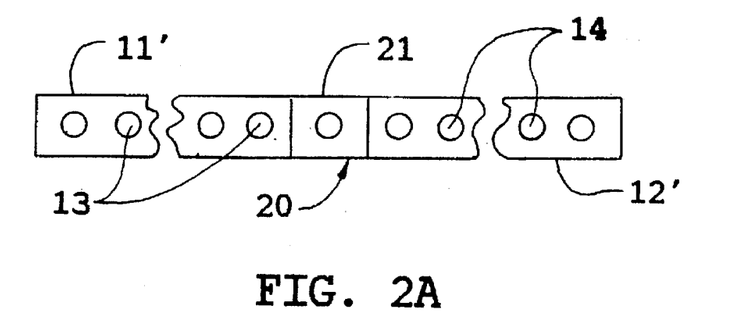
FIG. 2A is a side elevational view of the hybrid platen, showing heating and cooling portions separated by an insulating portion.
Figure 3:
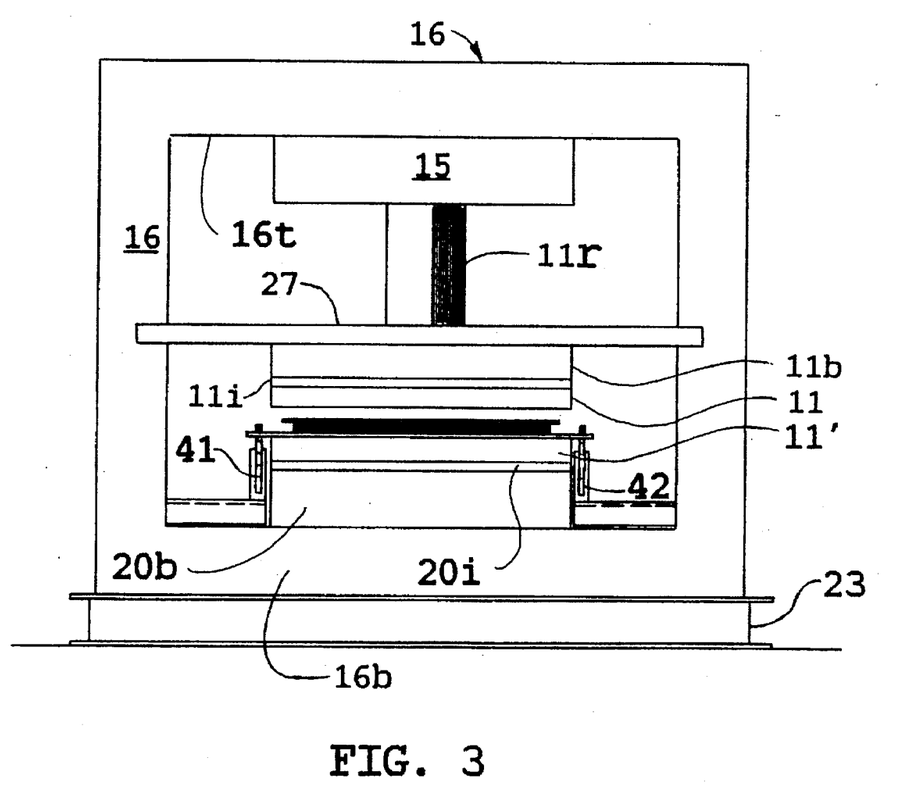
FIG. 3 is a front end elevational view of the machine shown in FIG. 2, showing the area occupied by the hybrid platen between the spaced-apart edge-conveyors mounted for operation in the window frame structure.

To separate and insulate the lower heating platen 11' from the adjacent lower cooling platen 12', it is desirable to provide an insulating zone 21 (see FIG. 2A). It will now be appreciated that the purpose of the hybrid platen is to provide a continuous fixed lower surface upon which a book can be supported in the lateral plane so as to minimize its proclivity to be warped by the temperature changes to which it is subjected, when it is not under pressure in the process path. It is only because of the speed and manner in which a book is transferred from a heating stage to a cooling stage, and the ability to limit the travel of the rams to a minimal amount, that warpage of the book, which is critical, is minimized in this design. Of course, having discovered the criticality of minimizing warpage, one may obtain the effect of a continuous bottom platen by fixedly mounting separate lower heating and cooling bottom platens very close together, less than 5 cm apart, with their upper surfaces in the same lateral plane, so that is the surface is substantially continuous.

The upper platens 11 and 12 are fixedly mounted to bolsters 11b and 12b, respectively, and spaced therefrom by insulation pads 11*i* and 12*i*. As shown in FIG. 2, upper tie-plate 15 supports the actuating mechanisms for the vertically reciprocable rams 11*r* and 12*r* which provide the motive force for the upper platens 11 and 12. Tie-plate 15 is welded to upper transverse members 16*t*, of the several successive window frames 16 respectively, within which the heating and cooling presses are mounted. The window frames in turn, are mounted vertically on a transport frame F (FIG. 3) which allows the laminating machine to be moved as a unit, from one location to another. The inner edges of the window frames are chamfered to 45°, and in cooperation with lateral guide members 27 which are affixed for and aft each bolster 11*b* and 12*b*, guide the rams 11*r* and 12*r* in a vertical direction, and prevent the bolster from rotating while the rams are being moved vertically, from a "daylight open" position to a "daylight closed" position.

The hybrid platen 20 is provided with a bolster 20*b* and spaced therefrom by insulation pad 20*i*. The bolster 20*b* is preferably supported on the bottom transverse members 16*b* (FIG. 3) of window frames 16. The window frames are of rigid material, typically steel having a cross-section of about 5 cm×10 cm (2"×4"). The aligned frames provide a flow-through processing zone provided by the hybrid platen and the edge-conveyors on each side. This linear processing zone is in open communication with the atmosphere at the front and rear of the frames when the upper platens are retracted.

Two window frames, each securing opposed longitudinal ends of the heating section of the bolster 20*b* are generally sufficient for the heating press, since the pressure required during heating is generally lower than 1378 kPa (200 psi) for PVC split core sheets conventionally used for the purpose. A lower or higher pressure may be required to laminate credit cards made from other thermally sensitive and thermobondable materials.

However, cooling is preferably effected under higher pressure, typically 2756 kPa (400 psi), and additional reinforcing window frames may be required for the upper cooling platen 12 and the cooling section 12' of the bolster 20*b*. Adequate reinforcing must be provided particularly if the pressure in the cooling press is in the range from about 3450 Kpa (500 psi) to 6890 kPa (1000 psi). As shown, a total of five window frames are preferably used for PVC laminates herein. All main operating components of the laminating machine are mounted within the processing zone and there is no structural interference to the operation of the rams 11*r* and 12*r*.

The temperatures of each heating platen is maintained essentially constant at a temperature sufficiently above the Tg or melting point of at least one of the materials to be laminated, so as to allow for the temperature gradient across the cross-section of a sandwich and the resulting loss in heat transfer, yet at least reach, and preferably exceed the thermobonding or laminating temperature without exceeding it excessively. The temperature of the heating platens for laminating PVC core sheets to PVC overlays, or to overlays of amorphous Kodar polyester, is preferably obtained with electrical resistance heating means which provide adequate heat duty for the task at hand, and which maintains the platens in the range from 121° C. (250° F.) to 232° C. (450° F.) depending upon the combined heat duty of the platen and book. In turn, this depends upon the number of sets in a sandwich, the thermal conductivity of the lamination pads 32*u*, 32*b* and polished metal plates 34*u*, 34*b* (see FIG. 6) used, and the chemical structure and molecular weight of the polymers from which the sheets and overlays are formed. The optimum temperature for the platens is typically arrived at by simple trial and error to which one skilled in this art is enured.

The temperature of each cooling platen is also maintained essentially constant, and is typically maintained with platens internally cooled with cold water, or some other fluid which may be refrigerated. The temperature is typically maintained in the range from 10° C. (50° F.) to about 24° C. (75° F.) the preference being to keep the platens as cold as can economically be justified.

Essentially identical cross-braces 25, preferably of 7.5 cm×7.5 cm angle iron, are provided on the vertical members of the window frames, mounted so that one angle of each cross-brace projects in the lateral plane, at right angles to the vertical surfaces of the vertical members 16*v* of the window frames, and the upper surfaces of all the projecting angles are coplanar.

The edge-conveyor means, together identified generally by reference numeral 40, is unidirectional in the direction of the x-axis, in that it conveys a book deposited thereon in one direction only. The particular edge-conveyor illustrated comprises a pair of separate, endless chains 41 and 42 each of which is provided with plural dogs 43 equidistantly spaced along each chain. Dual endless chain loops, drivingly engaged upon sprockets, are spaced apart on either side of the hybrid platen 20 and coplanarly therewith so that a book lying on the platen 20 may be engaged by the dogs 43. The bottom cover plate of each book is provided with means to engage the dogs positively, so that the book stops when and where the chain stops without any "carry". An alternative is to use a single endless chain loop and an opposed, edge-guide in which the corresponding bottom edge of the book is securely carried, as is disclosed in the Noto et al U.S. Pat. No. 4,543,147, the disclosure of which is incorporated by reference thereto as if fully set forth herein.

Figure 5:
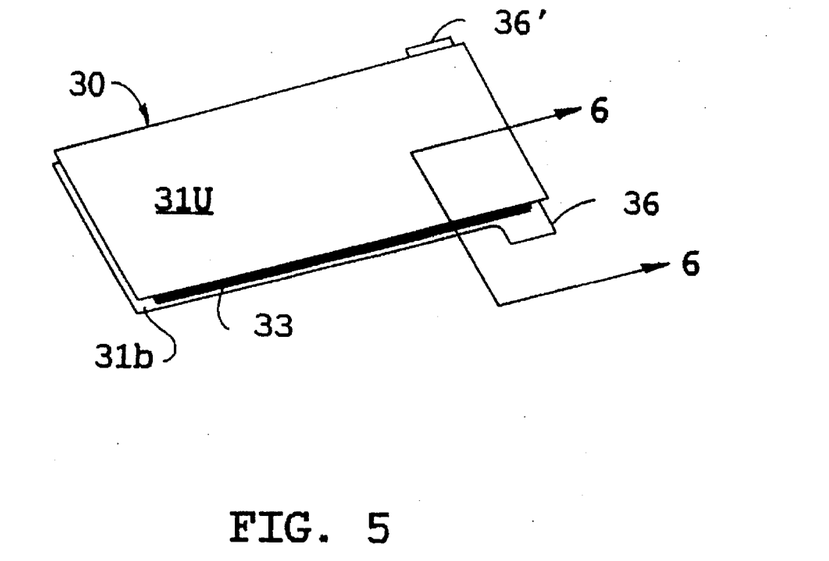
FIG. 5 is a perspective view of a monobook having at least the lower cover plate in a shape referred to as a "T-shirt" shape which is particularly adapted for use with chain conveyor means having "dogs" on the chains. The overlapping cover plates are not held together by any fastening means. The dogs engage the lower cover plate in each of the radii near one end of the lower cover plate. The location for engagement of the dogs is referred to as the armpit of the T-shirt shape.

To operate the machine to laminate a single set, a monobook referred to generally by reference numeral 30 in FIG. 5, is preferred. The advantage of operating with a monobook is that the travel of a ram is minimal requiring minimal time, and the time to heat the sandwich and cool the laminate is very short, typically less than 1 min and preferably less than 30 sec through the process zone. Because the monobook rests on the hybrid platen there is essentially no warpage of the monobook, which in turn makes it possible to use the dogs on an endless conveyor means to engage and transport the monobook along the hybrid platen.

The monobook 30 includes separate upper and bottom cover plates 31*u* and 31*b* between which is sandwiched a set of sheets 33. Upper plate 31*u* is a rectangular sheet, preferably having dimensions slightly greater than those of the set 33, and bottom cover plate 31*b* has substantially the same dimensions as the upper cover plate 31*u* except for projecting tabs 36 and 36' near the leading edge (first in the direction of travel) which is to be dragged through the processing zone by the dogs of the chain conveyor means.

Figure 6:
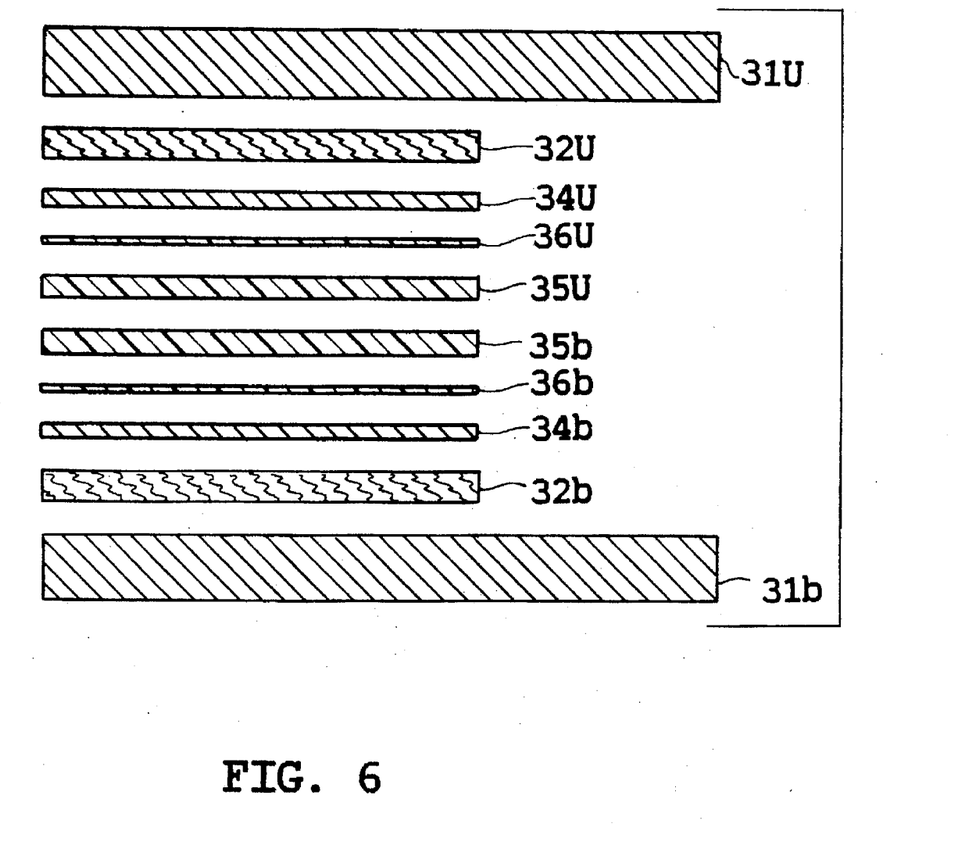
FIG. 6 is a side elevation exploded view, broken away, schematically illustrating on a much enlarged scale, the make-up of a monobook with a single set ("1-up book") sandwich.

The set 33 shown consists essentially of two split core sheets 35*u* and 35*b* and two overlays 36*u* and 36*b*. Sandwiching the overlays are polished plates 34*u* and 34*b*, each polished plate in contact with identical lamination pads 32*u*, 32*b*. If desired, an adhesive may be used to maintain the precise correspondence of the sheets and to facilitate lamination.

The advantage of using separate planar cover plates with no fastening means is that a book may be assembled mechanically by a collating means before it is fed, whether manually or automatically, to the entrance station of the machine.

Any other edge-conveyor means, for example endless belts as disclosed in the parent application, may be used which effectively transports books synchronously for predetermined equal distances when it is stopped, this most preferably being effected with microswitches.

Figure 7:
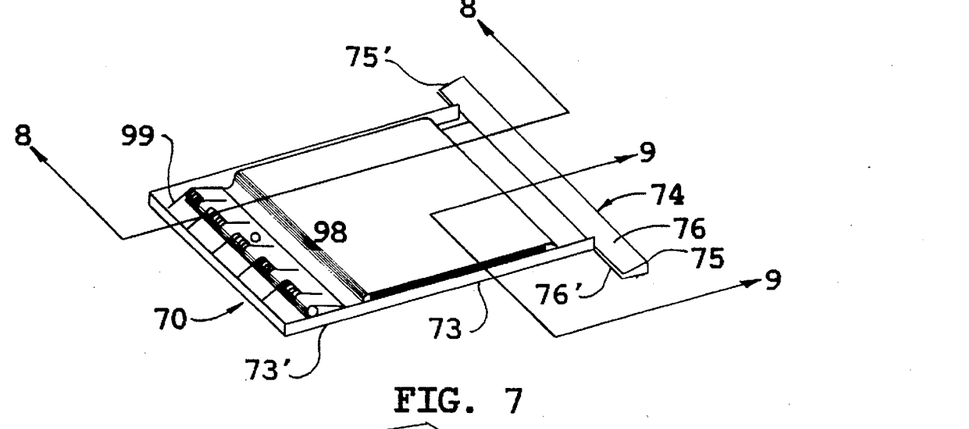
FIG. 7 and FIG. 7A show a perspective view of a novel "quick-opening" and "quick-locking" hinged carrier, also for use with chains having dogs. The carrier is free of any conventional fastening means to facilitate quickly loading a sandwich of sheets, quickly stripping the laminate, and re-charging the carrier with a fresh sandwich.

For plural sets, a book 70 schematically illustrated in the perspective view in FIG. 7, free of conventional fasteners, is typically about 2.5 cm (1") in height, unless it contains a much larger or smaller number of sets than is usual. The lack of a conventional fastener, for example, a pair of threaded rods with wing-nuts, to fasten the upper cover plate to the bottom cover plate permits minimal travel of the rams. Irrespective of the width and length of the cover plates of the carrier, there is no need to have a daylight greater (in height) than about 5 cm (2"). It will be appreciated that, wing nuts with cooperating threaded rods may be used with the same very short travel of the rams provided sufficient space be provided between the opposed fasteners to clear the upper platen as it comes in contact with the upper cover plate of the book.

Figure 7A:
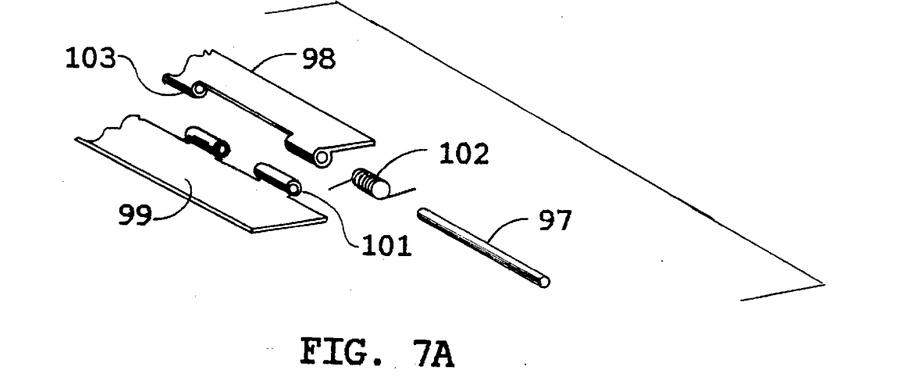
Figure 8:
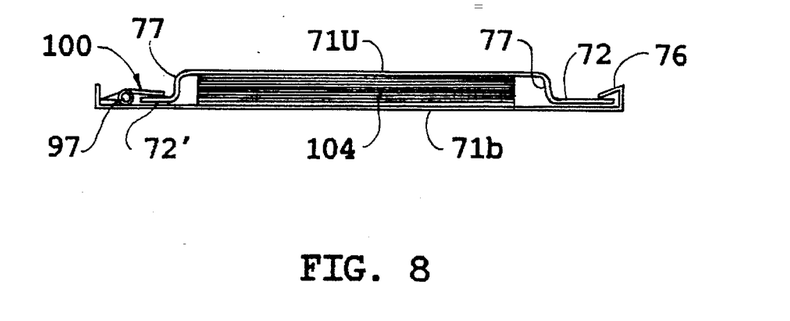
FIG. 8 is an end elevational view of the book in FIG. 7.

Referring further to FIG. 7 and also to FIGS. 7A and 8, it is seen that the book 70 does not have projecting fasteners to secure the upper cover plate 71u which is separate from the bottom cover plate 71b. Between the cover plates is held at least one, but typically, two or more sets 33 to be laminated in a sandwich 104. Upper cover plate 71u is a rectangular sheet having downwardly flanged leading and trailing edges which are generally S-shaped, defining a step 77 and terminating in laterally projecting leading and trailing edges 72 and 72'. Bottom cover plate 71b comprises a predominantly rectangular portion 73 the leading edge of which terminates in a clip 74, ends 75 and 75' of which project beyond the side edges of the portion 73. The clip 74 is U-shaped except that the upper portion 76 of the clip is bent downwards, close to the upper surface of the lower portion 76' to afford purchase for the projecting edge 72 of the upper cover plate.

As seen in the detail shown in FIG. 7A, the trailing edge of the portion 73 is provided with a spring-loaded elongated hinge means 100, including hingedly interdigitated locking leaves 98 and 99, the latter being welded to the edge 73' so that the hinge functions as a reverse hinge. A spring 102 is held between knuckles 101 of leaf 99 and knuckles (or sleeves) 103 of leaf 98 with a hinge pin 97 passed through the knuckles. The knuckles 101 and 103 are spaced apart sufficiently to accommodate plural spring means 102 coaxially aligned on the hinge pin 97.

The thickness of the sandwich 104 held down by the cover plate is matched to the height of the step 77, being greater than this height, so that after the book is compressed, the upper cover plate 71u remains in contact with the laminated sandwich.

Reverting again to FIGS. 1, 2 and 3, it is essential that the laminating system include an entrance station if a chain conveyor means is used. A collator means (not shown) may assemble a single set for a sandwich in a monobook to be processed and deposited at the entrance station. A collator typically comprises plural vertically spaced apart compartments each of which contains a stack of sheets. To assemble a sandwich shown in FIG. 6, a lamination pad 32b is discharged from a stack of lamination pads onto a bottom cover plate 31b, sequentially followed by a polished plate 34b, an overlay 36b, a split core sheet 35b, a split core sheet 35u, an overlay 36u, a polished plate 34u, a lamination pad 32u, each discharged from a corresponding stack. The upper cover plate is then positioned over the sandwich and it is positioned at the entrance station 60.

For simplicity of operation, it is preferred to use, in addition to the edge-conveyor means, three conveyor means for economical operation of the system.

A loading-conveyor means 50 allows a book to be guided and preferably automatically urged with a pneumatic "pusher" (not shown), to the entrance station 60. Loading conveyor 50 is preferably a stationary table having a roller ball surface 51 comprising a multiplicity of roller balls 52 over which a book is easily moved omnidirectionally. Roller balls 52 are used because side-loading a book onto the entrance station 60, requires a 90° change in direction of the path of the book after it is re-charged by an operator. The operator stands besides a feed conveyor 53 which is also a table, but presents a lateral surface 54s over which books are conveyed. This surface 54s is tangential to multiple cylindrical rollers 54 laterally disposed in spaced apart relation along the longitudinal x-axis, so as to direct a book therealong substantially unidirectionally onto the surface 51 of the loading-conveyor means 50 where the tray contacts a deflector means 56 which deflects it, changing the direction of its path by 90°. As soon as the heating press discharges a heated book, a book from the entrance station is loaded into the heating press, and a re-charged book travelling along the y-axis on loading-conveyor 50, rolls onto the entrance station.

The feed conveyor 53 is coextensive only with the overall length of the heating press 11 and the cooling press 12. The feed-conveyor 53 is also used as a table upon which a book is unloaded and re-charged after it is received from a discharge-conveyor 55. Discharge conveyor 55 is sufficiently wide to receive a book which is then deflected when it contacts deflector 56' with the help of a pneumatic "pusher" (not shown) so as to change the direction of its path 90°. For ease and convenience, and because of the change of direction as on the loading-conveyor 50, the conveyor 55 has a surface 57 comprising a multiplicity of roller balls 52.

In the basic embodiment of the laminating system, the edge-conveyor means 40, is substantially coplanarly disposed in relation with each of the conveyors 50, 53 and 55 so that the path of a book through the system is a lateral essentially coplanar one, and the operator never has to lift a book.

Figure 4:
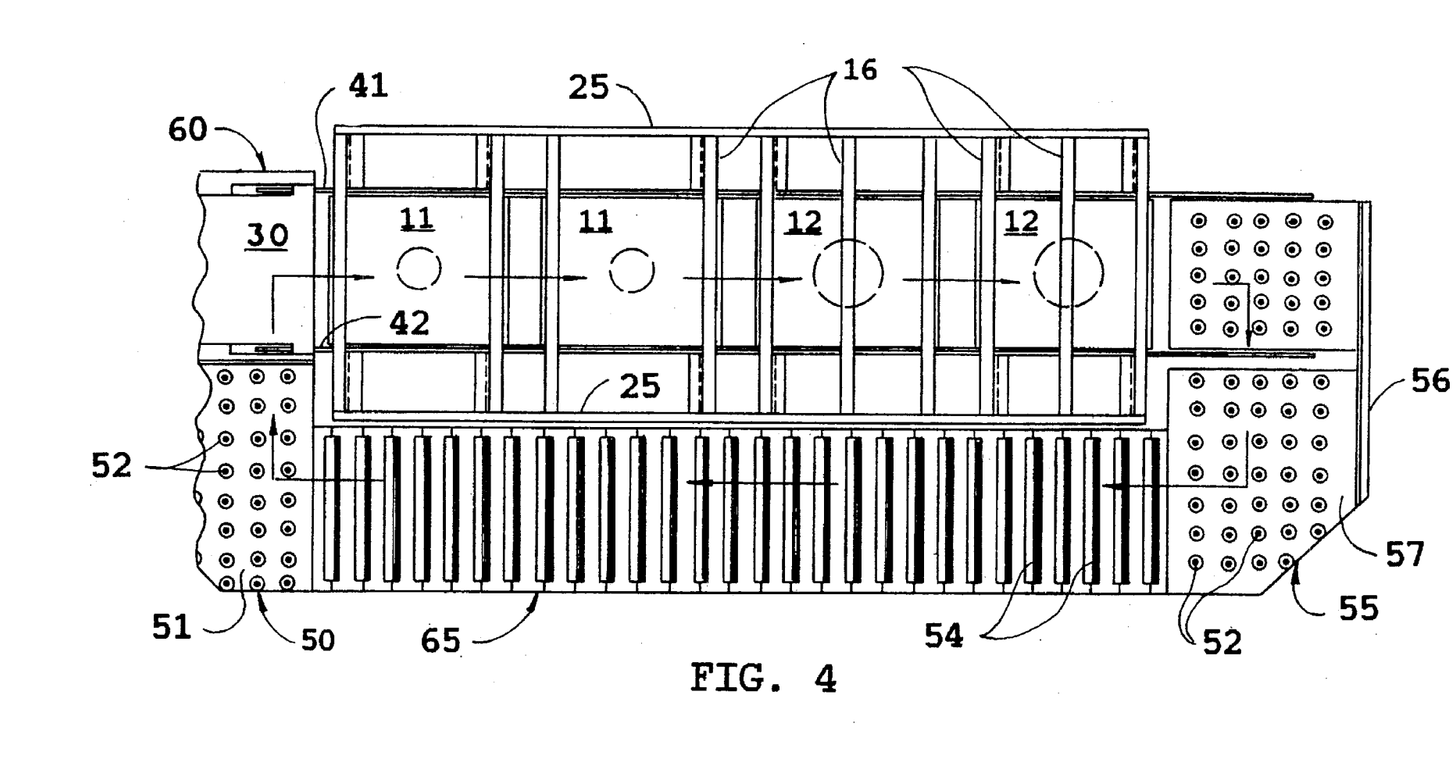
FIG. 4 is a plan view of a laminating machine having two laminating units.

Referring now to FIG. 4 there is shown a plan view of the machine using tandem heating and cooling presses in two pairs of ganged presses, all having a substantially continuous hybrid platen onto which a book is transferred from the entrance station 60. A first heating platen 11 (a "preheat" platen) is followed by a second heating platen 11A ("finish" heat platen) to finish heat a sandwich, and a first cooling platen 12 ("precooling") is followed by a second cooling platen 12A ("finish" cooling) to finish cool the sandwich, the platens 11 and 11A being essentially identical as are platens 12 and 12A. To process the same book as one processed in the machine shown in FIG. 1, the spacing between the successive platens 11, 11A, 12 and 12A is the same as in FIG. 1 so that the book is advanced in equidistant increments. It will now be evident that the book will be subjected to successive heating cycles and successive cooling cycles each heating and cooling cycle in the machine of FIG. 4 being essentially half that of the cycle in FIG. 1. Therefore the throughput of the machine of FIG. 4 is about double that of the machine of FIG. 1 though the total heat transferred to the book (to heat the sandwich), and from the book (to cool the sandwich) is the same.

Figure 1:
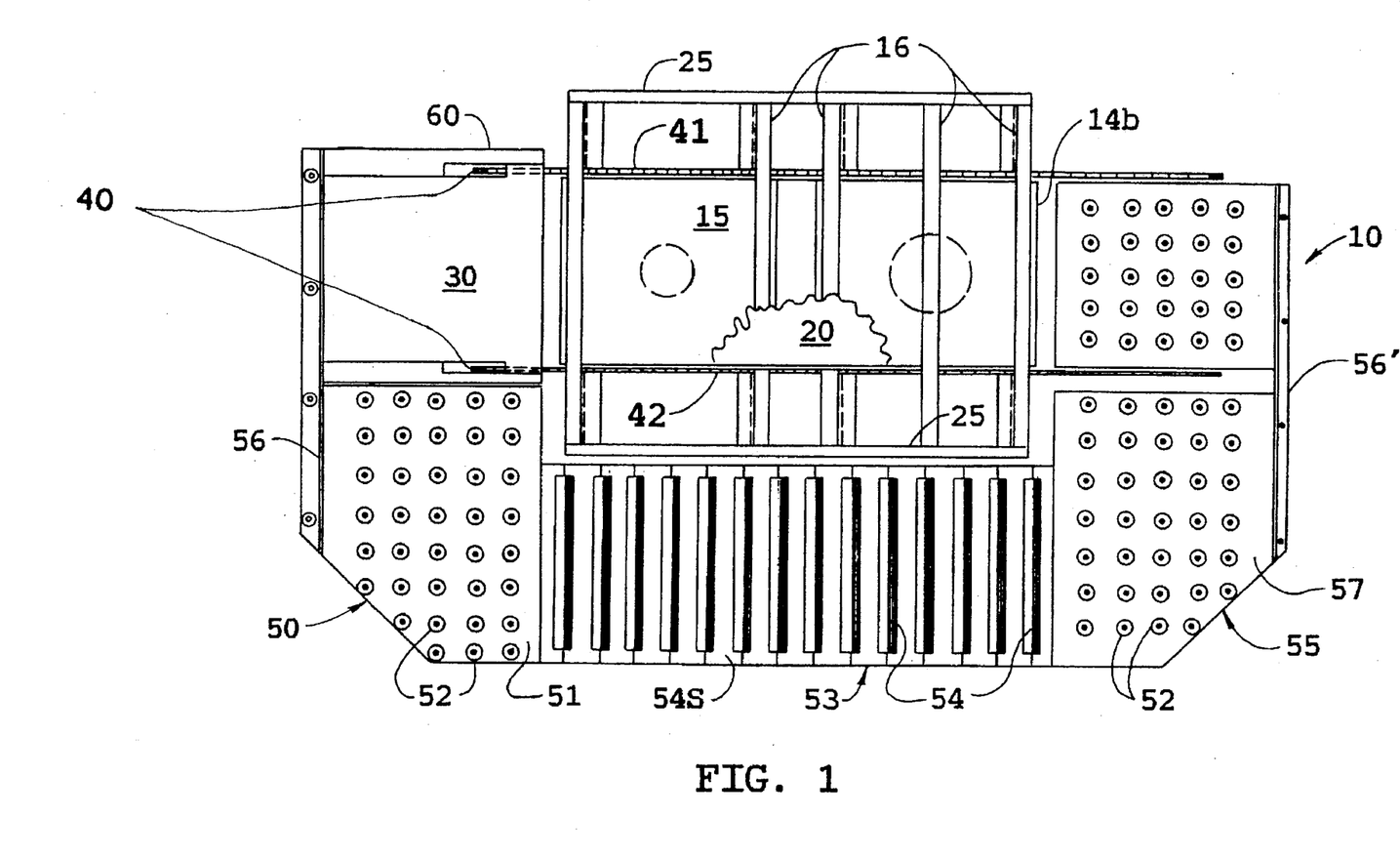

Since the discharge conveyor 55 is the same as that used before in FIG. 1, the feed conveyor 65 now is coextensive with the length of both the heating and cooling presses 11 and 12.

Figure 9:
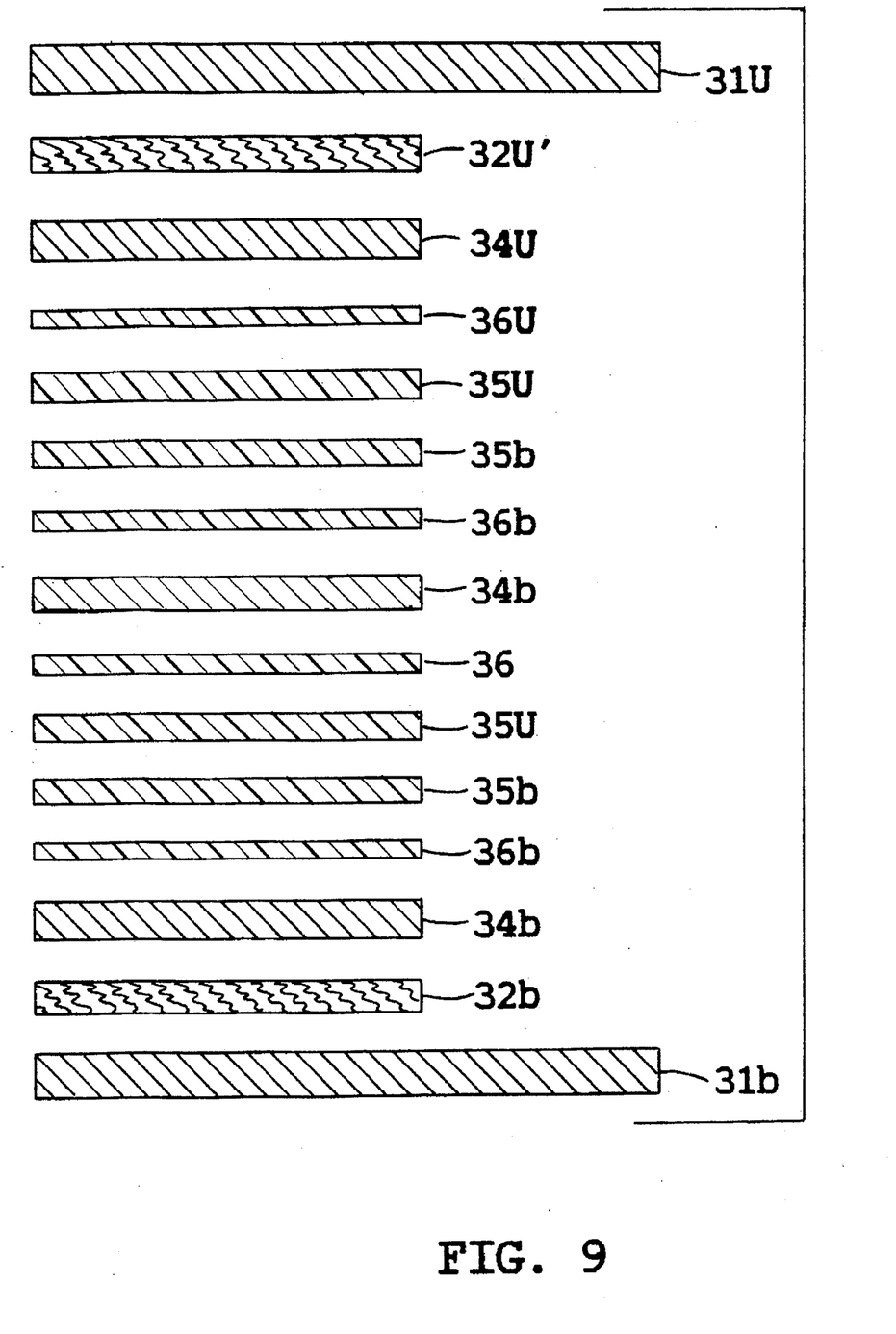
FIG. 9 is a side elevation exploded view, broken away, schematically illustrating on a much enlarged scale, the make-up of a book with two sets ("2-up book") in a sandwich.

FIG. 9 schematically illustrates, on a much enlarged scale, the components of a book having a sandwich of two sets.

Figure 10:
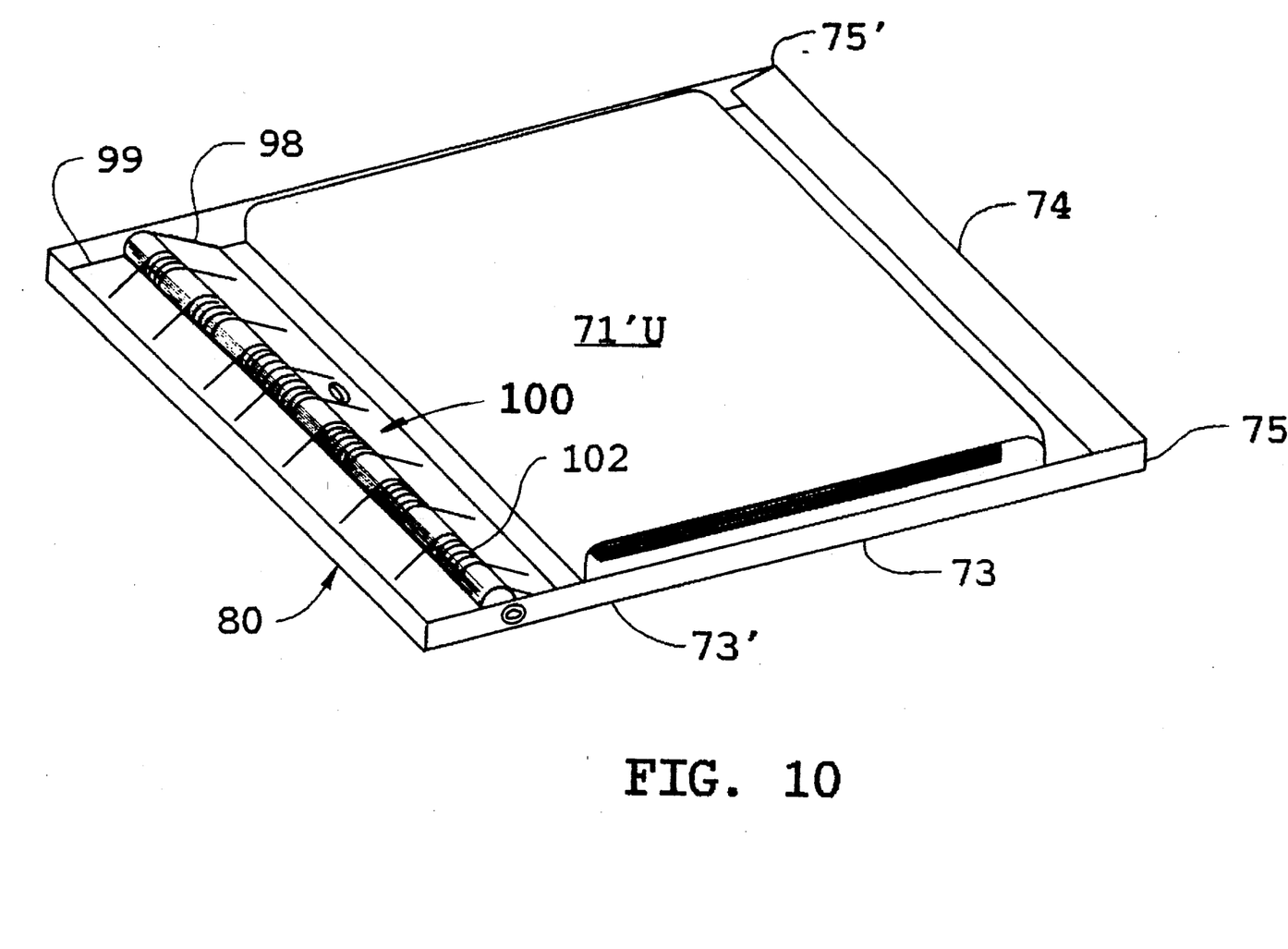
FIG. 10 is a perspective view of a novel "quick-opening" and "quick-locking" hinged carrier, adapted for use with endless belt conveyor means. As before, the carrier is free of any fastening means to hold the upper cover plate to the bottom cover plate. This carrier can also be quickly loaded with a sandwich of sheets; and, when the laminate is formed, it can be quickly stripped, and the carrier re-charged with a fresh sandwich.

In a manner analogous to that described hereinabove, an endless loop belt conveyor means may be used in a manner described in the parent application. Since use of belt conveyor means requires that the book be supported along the major portion of each of its side edges, a book of conventional design, or the book illustrated in FIG. 10 is used. The construction of the book 80 in FIG. 10 is analogous to that of the book in FIG. 7, except that the upper and bottom cover plates are rectangular, the bottom plate having the same clip 74 and hinge means 100. Note, however, since the upper cover plate 71'u and the bottom plate 73' are wide enough to rest on the belts, the sides of the book 80 extend past the surfaces of the upper and lower platens. The area of the sandwich is less than that of the book, and the sandwich is positioned in the book so as to be compressed between opposed platens. The remaining construction of the components of the book are analogus to the book shown in FIGS. 7, 7A and 8.

I claim:

1. In a process for sequentially forming a series of laminates in a laminating system comprising, heating and cooling presses without a stacking press, loading carrier assemblies or books, each holding at least one set of congruently stacked thermobondable sheets of a synthetic resinous material into a daylight opening of a heating press having an upper and a lower heating platen; heating and compressing the sheets to form a heated laminate; transferring the heated laminate into a daylight opening of a cooling press having an upper and a lower cooling platen; heating and compressing the sheets to form a cooled laminate; and discharging a cooled laminate from the cooling press; wherein each of said foregoing steps are carried out at predetermined intervals; the improvement comprising, a) introducing books, one at a time, into the heating press provided between an upper reciprocable heating platen, and a lower heating section of a fixed, hybrid bottom platen, the heating platen and hybrid platen being maintained at a laminating temperature above the glass transition temperature or the melting point of the material, using an entrance station which provides a loading-path parallel to the processing path through the hot and cold presses;

b) advancing the reciprocable upper platen of the heating press downward to bias the book, exerting for a predetermined period of time, a desired pressure against the lower heating section of the hybrid platen directly beneath and in spaced apart relation with the upper platen;

c) retracting the upper platen upward;

d) conveying each book into the cooling press and biasing each book with a desired pressure against the lower cooling section of the hybrid platen with a down-acting upper cooling platen, for a predetermined time, until the book is cooled to a temperature below the glass transition temperature or the melting point of the material from which the laminate is formed;

e) and discharging each cooled book from the cooling press while simultaneously conveying another book into the cooling press.

* * * * *